United States Patent Office 3,629,315
Patented Dec. 21, 1971

---

3,629,315
ADDUCTS OF TETRABROMODIALKOXY CYCLOPENTADIENES AND ACRYLONITRILE
Richard Garth Pews, Midland, Clare R. Hand, Sanford, and Carleton W. Roberts, Midland, Mich., assignors to The Dow Chemical Company, Midland, Mich.
No Drawing. Original application Apr. 12, 1968, Ser. No. 721,106, now Patent No. 3,489,814, dated Jan. 13, 1970. Divided and this application June 16, 1969, Ser. No. 833,679
Int. Cl. C07c 121/48
U.S. Cl. 260—464                                    1 Claim

ABSTRACT OF THE DISCLOSURE

Compositions of matter that are the Diels-Alder adducts of tetrabromodialkoxy cyclopentadienes having the general formula $C_5Br_4(OR)_2$ wherein R is an alkyl radical having from 1 to 8 carbon atoms and acrylonitrile. Said adducts have utility in pig weed control agents.

---

This application is a divisional application of our prior application Ser. No. 721,106 filed Apr. 12, 1968, now U.S. Pat. 3,489,814.

This invention concerns new compositions of matter that are the adducts of tetrabromodialkoxy cyclopentadienes and acrylonitrile.

The tetrabromodialkoxy cyclopentadiene starting materials have the general formula

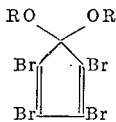

wherein R is an alkyl radical having from 1 to 8 carbon atoms. The compounds are prepared by reacting hexabromocyclopentadiene with an alkali metal alkoxide at temperatures between about 10° and minus 80° C. and at atmospheric pressure or thereabout. The reaction is illustrated by the equation for the dimethoxy compound as follows:

$$C_5Br_6 + 2NaOCH_3 \rightarrow C_5Br_4(OCH_3)_2 + 2NaBr$$

Other dialkoxy compounds are prepared by employing the corresponding alkali metal alkoxide, e.g., sodium ethoxide, potassium propoxide, sodium butoxide, sodium hexoxide or potassium octoxide, in the reaction with hexabromocyclopentadiene to form the corresponding derivatives.

The tetrabromodialkoxy cyclopentadienes undergo the Diels-Alder reaction with certain ethylenically unsaturated organic compounds to form other new compositions of matter.

We have found that the tetrabromodialkoxy cyclopentadienes having the above formula react with acrylonitrile to form the corresponding dienophiles.

The reaction can be carried out at temperatures between about 80° and 200° C. and at atmospheric or superatmospheric pressure.

The new compositions are useful as the active ingredient of spray compositions for the control of pig weed. They are also useful as flame-proofing agents and as fire retardants when incorporated with flammable plastics such as polystyrene or polyethylene, or with paper or cellulose or cotton linters or cotton cloth.

The following example illustrates a way in which the invention can be practiced, but is not to be construed as limiting its scope.

EXAMPLE

A charge of 10 grams of tetrabromodimethoxycyclopentadiene and 5 ml. of acrylonitrile were sealed in a glass tube and heated under time and temperature conditions as follows: 1 hour at 140° C.; 1 hour at 160° C.; and 1 hour at 190° C. After cooling the product was recovered. There was obtained 6 grams of crystalline product melting at 95–96° C. It was analyzed and found to contain:

Theory $C_{10}H_9Br_4O_2N$ (percent): C, 24.24; H, 1.83; Br, 64.64. Found (percent): C, 24.30; H, 1.78; Br, 64.85.

The compound has the structure

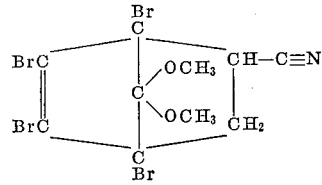

In tests of the compound as the active ingredient in spray compositions for control of pig weed it was found to give 100 percent kill at a concentration of 10 parts per million parts of the spray composition.

We claim:
1. An adduct of 1,2,3,4-tetrabromo-5,5-dimethoxycyclopentadiene and acrylonitrile of the formula

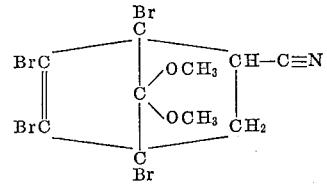

References Cited

UNITED STATES PATENTS 3,515,740    6/1970    Frampton _____ 260—464

JOSEPH PAUL BRUST, Primary Examiner

U.S. Cl. X.R.
71—105